(12) United States Patent
Jin et al.

(10) Patent No.: US 12,185,023 B2
(45) Date of Patent: Dec. 31, 2024

(54) METHOD AND APPARATUS FOR GENERATING VIDEO INTERMEDIATE FRAME

(71) Applicant: SAMSUNG ELECTRONICS CO., LTD., Suwon-si (KR)

(72) Inventors: Xin Jin, Nanjing (CN); Guotao Shen, Nanjing (CN); Youxin Chen, Nanjing (CN); Longhai Wu, Nanjing (CN); Jie Chen, Nanjing (CN); Jayoon Koo, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/206,459

(22) Filed: Jun. 6, 2023

(65) Prior Publication Data
US 2023/0403371 A1 Dec. 14, 2023

(30) Foreign Application Priority Data
Jun. 14, 2022 (CN) .......................... 202210669349.9

(51) Int. Cl.
*H04N 7/01* (2006.01)
*G06T 7/246* (2017.01)

(52) U.S. Cl.
CPC ............. *H04N 7/014* (2013.01); *G06T 7/246* (2017.01); *H04N 7/0127* (2013.01); *G06T 2207/10016* (2013.01); *G06T 2207/20084* (2013.01)

(58) Field of Classification Search
CPC .... H04N 7/014; H04N 7/0127; H04N 7/0132; H04N 7/0135; G06T 7/246; G06T 2207/10016; G06T 2207/20084; G06T 3/4007; G06T 3/4046; G06N 3/045
See application file for complete search history.

(56) References Cited

U.S. PATENT DOCUMENTS

| 11,122,238 | B1 | 9/2021 | van Amersfoort et al. |
| 11,354,541 | B2 | 6/2022 | Wang et al. |
| 2016/0301848 | A1* | 10/2016 | Taggart ..................... G06T 5/40 |
| 2018/0293737 | A1* | 10/2018 | Sun ......................... G06T 7/207 |

(Continued)

OTHER PUBLICATIONS

Niklaus, Simon et al., "Context-aware Synthesis for Video Frame Interpolation", CVPR, 2018, pp. 1701-1710.

(Continued)

*Primary Examiner* — Kyu Chae
(74) *Attorney, Agent, or Firm* — Sughrue Mion, PLLC (57) ABSTRACT

A method for generating a video intermediate frame, including obtaining a target video frame pair; constructing an image pyramid for each video frame in the target video frame pair; and generating an intermediate frame of the target video frame pair by using a bidirectional optical flow estimation model and a pixel synthesis model in a layer-by-layer recursive calling manner according to an order of the image pyramid from a high layer to a low layer based on the image pyramid, wherein the generating of the intermediate frame of the target video frame pair comprising: repairing a bidirectional optical flow corresponding to a previous layer using the bidirectional optical flow estimation model, and repairing a previous intermediate frame corresponding to the previous layer using the pixel synthesis model.

20 Claims, 8 Drawing Sheets

(56) References Cited

U.S. PATENT DOCUMENTS

2020/0118245 A1* 4/2020 Gao ................. G06T 7/0002
2021/0279840 A1* 9/2021 Chi .................... G06T 3/40
2022/0092795 A1 3/2022 Liu et al.

OTHER PUBLICATIONS

Niklaus, Simon et al., "Softmax Splatting for Video Frame Interpolation", CVPR, 2020, pp. 5437-5446.
Sim, Hyeonjun et al., "XVFI: eXtreme Video Frame Interpolation", ICCV, 2021, pp. 14489-14498.
Bao, Wenbo et al., "Depth-Aware Video Frame Interpolation", CVPR, 2019, pp. 3703-3712.
Lee, Sungho et al., "Enhanced Correlation Matching based Video Frame Interpolation", WACV, 2021. (9 pages total).
Choi, Myungsub et al., "Channel Attention Is All You Need for Video Frame Interpolation", The Thirty-Fourth AAAI Conference on Artificial Intelligence (AAAI-20), 2020, pp. 10663-10671.
Lee, Hyeongmin et al., "AdaCoF: Adaptive Collaboration of Flows for Video Frame Interpolation", CVPR, 2020, pp. 5316-5325.
Park, Junheum et al., "Asymmetric Bilateral Motion Estimation for Video Frame Interpolation", ICCV, 2021, pp. 14539-14548.

* cited by examiner

FIG. 4 overlapped input frame | optical flow of PWC-Net | optical flow according to embodiments of the present disclosure

METHOD AND APPARATUS FOR GENERATING VIDEO INTERMEDIATE FRAME

CROSS-REFERENCE TO RELATED APPLICATION

This application is based on and claims priority under 35 U.S.C. § 119 to Chinese Patent Application No. 202210669349.9, filed on Jun. 14, 2022, in the China National Intellectual Property Administration, the disclosure of which is incorporated by reference herein in its entirety.

BACKGROUND

1. Field

The disclosure relates to a computer vision technology, and more particularly, to a method and apparatus for generating a video intermediate frame.

2. Description of Related Art

Video frame interpolation may be an important application in computer vision, which aims to improve the frame rate of video by synthesizing a frame (e.g., an intermediate frame) that does not exist between consecutive frames, so that motion in the video may become smoother and thus the viewing experience of viewers may be improved. For example, the frame rate of some older videos may be limited by shooting devices at the time of capture, and may be for example only 25 frames per second (FPS). In contrast, modern advanced televisions may support a higher playback speed of for example 120 FPS or higher. When these videos with low frame rate are played on modern televisions, there may be a phenomenon of "stuck" frames, and the best performance of the televisions cannot be realized. To solve the above problem, an artificial intelligence technology may be used to increase the frame rate of video to 120 FPS in real time by frame interpolation. In addition, the video frame interpolation technology may be used in video compression, view synthesis, adaptive streaming media, etc. In particular, for the application of metaverse, the real-time requirement of high-definition video interaction is more and more important. However, the real-time transmission of high-definition and high frame rate video streams may place great pressure on network bandwidth. Under the condition of limited bandwidth, it is a very effective application scheme to transmit low frame rate video streams, and then convert the low frame rate video streams into high frame rate video at a client by using the video frame interpolation technology.

Some deep learning algorithms have achieved successes in the field of video frame interpolation. In particular, pixel synthesis based on optical flow may be used in the field of video frame interpolation. In this kind of algorithm, an optical flow between an input frame and a target frame may be estimated first, and then the estimated optical flow may be used to guide the synthesis of intermediate frame. The optical flow may depict the pixel-level motion between consecutive frames, and may play a role in the pixel synthesis process to move pixels in the input frame onto the intermediate frame by a forward-warping operation or a backward-warping operation to the middle. Based on the result of the warping operations, a synthesis network may be used to fuse the information of pixels and features and generate a final intermediate frame. Generally, an optical flow estimation network may be a pyramid-structured network, which may estimate an optical flow from coarse to fine in an iterative manner. The synthesis network may be a network with an encoder-decoder structure, which may be referred to as a U-Net structure.

However, many video frame interpolation schemes implemented through the pixel synthesis based on optical flow has some problems, such as low trueness, veracity, or accuracy of intermediate frames, and complex implementation. Specific reasons may be as follows.

In a conventional video frame interpolation scheme, the intermediate frame may be synthesized based on an optical flow estimation result. In this way, the accuracy of the optical flow estimation result may directly determine the accuracy of intermediate frame generation. However, a pyramid-structured optical flow model used to estimate the optical flow in the conventional scheme may output the final result at a layer with the highest resolution, and the error between the result and a real image may be large. Accordingly, the trueness, veracity, or accuracy of the intermediate frame synthesized based on the optical flow estimation result may be affected. For example, the error between the intermediate frame and the real image at the corresponding time may be large.

In addition, a conventional video frame interpolation scheme may adopt a one-time synthesis mode (e.g., a synthesis network module may be run only once), so that multiple down-sampling operations are required during the synthesis process to reduce the inaccuracy of optical flow estimation. As a result, the synthesis network may have a large scale and a large number of parameters, which may be unfavorable for deployment in edge devices in practical application scenarios.

SUMMARY

Provided is a method and apparatus for generating a video intermediate frame, which can effectively improve the trueness of the intermediate frame and reduce the implementation complexity.

Additional aspects will be set forth in part in the description which follows and, in part, will be apparent from the description, or may be learned by practice of the presented embodiments.

In an embodiment of the disclosure, a method for generating a video intermediate frame, including obtaining a target video frame pair; constructing an image pyramid for each video frame in the target video frame pair; and generating an intermediate frame of the target video frame pair by using a bidirectional optical flow estimation model and a pixel synthesis model in a layer-by-layer recursive calling manner according to an order of the image pyramid from a high layer to a low layer based on the image pyramid, wherein the generating of the intermediate frame of the target video frame pair comprising: repairing a bidirectional optical flow corresponding to a previous layer using the bidirectional optical flow estimation model, and repairing a previous intermediate frame corresponding to the previous layer using the pixel synthesis model.

In an embodiment of the disclosure, an apparatus for generating a video intermediate frame includes at least one processor; and a memory configured to store instructions which, when executed by the at least one processor, cause the at least one processor to: obtain a target video frame pair; construct an image pyramid for each video frame in the target video frame pair; and generate an intermediate frame of the target video frame pair by using a bidirectional optical flow estimation model and a pixel synthesis model in a layer-by-layer recursive calling manner according to an order of the image pyramid from a high layer to a low layer based on the image pyramid, wherein the at least one processor configured, when generating the intermediate frame of the target video frame pair, to: repairing a bidirectional optical flow corresponding to a previous layer by using the bidirectional optical flow estimation model, and repairing a previous intermediate frame corresponding to the previous layer by using the pixel synthesis model.

In an embodiment of the disclosure, a non-transitory computer-readable storage medium stores computer-readable instructions, which, when executed by at least one processor, cause the at least one processor to: obtain a target video frame pair; construct an image pyramid for each video frame in the target video frame pair; and generate an intermediate frame of the target video frame pair by using a bidirectional optical flow estimation model and a pixel synthesis model in a layer-by-layer recursive calling manner according to an order of the image pyramid from a high layer to a low layer based on the image pyramid, wherein the at least one processor configured, when generating the intermediate frame of the target video frame pair, to: repairing a bidirectional optical flow corresponding to a previous layer using the bidirectional optical flow estimation model, and repairing a previous intermediate frame corresponding to the previous layer using the pixel synthesis model.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Embodiments of the present disclosure are illustrated in detail below with reference to the accompanying drawings.

According to embodiments relating to a scheme for generating a video intermediate frame, when the generation processing of the intermediate frame is performed based on the image of each layer in the image pyramid, the optical flow obtained through the processing for the previous layer needs to be repaired, and based on the bidirectional optical flow obtained through performing the repairing for the current layer and the image of the current layer in the image pyramid, the intermediate frame obtained through the generation processing for the previous layer may be repaired. Thus, when the generation processing of the intermediate frame is performed based on the image of each layer, both the optical flow and the intermediate frame should be repaired, not only the intermediate frame should be repaired by using the optical flow obtained through the processing for the layer with the highest resolution. In this way, the robustness of the quality of optical flow estimation can be effectively improved, thereby effectively improving the accuracy of the intermediate frame. That is, the generated intermediate frame can be closer to a real image at the corresponding time, and the visual effect of frame interpolation can be effectively improved. Especially, the effect of frame interpolation on high-resolution video can be significantly improved.

In addition, by repairing the intermediate frame obtained through the processing for each layer, the intermediate frame needs to be synthesized for multiple times. Thus, the number of samplings required to be performed in each synthesis can be effectively reduced, thereby reducing the scale of the pixel synthesis model and greatly reducing the number of parameters of the model. Furthermore, by generating the intermediate frame by using a layer-by-layer recursive calling manner, the model can be shared by processing for various layers. Thus, the number of network parameters of the whole scheme can be effectively reduced. Therefore, the implementation complexity can be effectively reduced with the embodiments of the present invention.

Figure 1:
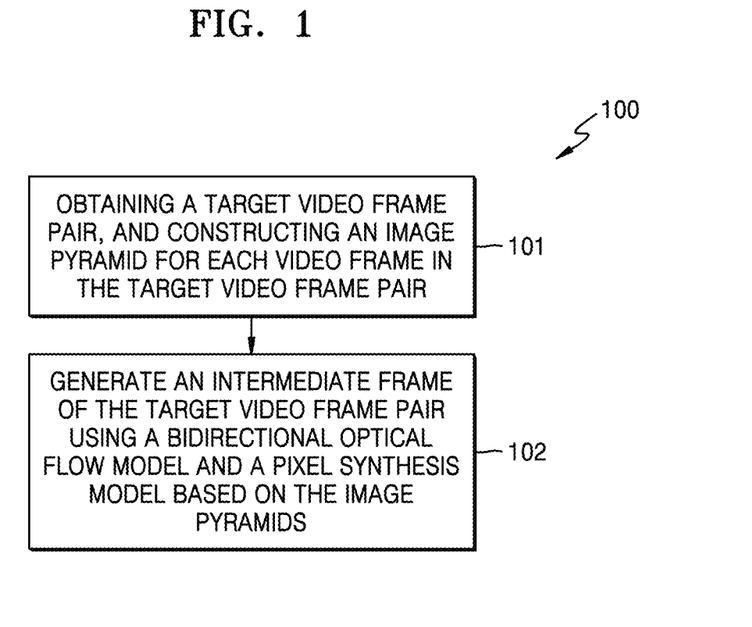
FIG. 1 is a flowchart of a method according to an embodiment.

FIG. 1 is a flowchart of a method according to an embodiment. As shown in FIG. 1, the method for generating a video intermediate frame implemented by this embodiment includes the following operations.

At operation 101, a target video frame pair may be obtained, and an image pyramid may be constructed for each video frame in the target video frame pair.

In this operation, in order to improve the efficiency of subsequent optical flow estimation, a corresponding image pyramid may be respectively constructed based on each video frame in the target video frame pair, which may include for example two consecutive video frames, for an intermediate frame to be generated currently, so that in subsequent steps, the generation processing of the intermediate frame may be performed layer by layer based on images of each layer in the image pyramid.

In this operation, the image pyramid may be constructed using any desired techniques. The number of layers of the image pyramid may be related to the resolution of the video frames in the target video frame pair. For example, video frames having a relatively high resolution may use a larger number of layers than video frames having a relatively low resolution.

In practical applications, the number of layers of the pyramid during a test phase may be improved to facilitate the prediction of an extra-large optical flow beyond a training set. For example, when the model of the embodiment is trained on low-resolution Vimeo90K, only a three-layer pyramid may be used to predict the optical flow on the training set. However, if the prediction is performed on an ultra-high resolution (4K) data set such as 4K1000 FPS, the number of layers of the pyramid may be increased during the test phase. For example, a seven-layer pyramid may be used.

At operation 102, based on the image pyramid, an intermediate frame of the target video frame pair may be generated by using a pre-trained bidirectional optical flow estimation model and a pixel synthesis model in a layer-by-layer recursive calling manner according to an order of the image pyramid from a high layer to a low layer. When the generation processing of the intermediate frame is performed based on an image of each layer in the image pyramid, based on an image of a current layer, a bidirectional optical flow obtained through the processing for a previous layer, which may be referred to for example as a previous intermediate frame, may be repaired by using the optical flow estimation model, and based on the repaired bidirectional optical flow and the image of the current layer, an intermediate frame obtained through the processing for the previous layer may be repaired by using the pixel synthesis model, to obtain an intermediate frame output by the processing for the current layer, which may be referred to for example as a current intermediate frame.

In this operation, based on the image pyramids of the two video frames obtained in operation 101, the intermediate frame between the two video frames may be generated by using the pre-trained bidirectional optical flow estimation model and the pixel synthesis model. Here, the time corresponding to the intermediate frame may be any time between the times of the two video frames, and is not limited to a time directly at a mid-point between the two video frames.

In embodiments, when the generation processing of the intermediate frame is performed based on the image of each layer, both the optical flow and the intermediate frame obtained through the processing for the previous layer may be repaired, instead of repairing only the intermediate frame using the optical flow obtained through the processing for the layer with the highest resolution. In this way, the robustness of the quality of optical flow estimation can be effectively improved, so that the veracity or accuracy of the intermediate frame can be effectively improved, and the effect of frame interpolation can be effectively improved, especially for high-resolution video. Furthermore, by repairing the intermediate frame in the processing for each layer, the scale of the pixel synthesis model can be greatly reduced, and the number of parameters of the model can be reduced. In addition, the network parameter scale of the entire intermediate frame generation scheme can be effectively reduced by using the layer-by-layer recursive calling manner, thereby effectively reducing the implementation complexity and improving the generation efficiency of the intermediate frame.

In operation 102, the intermediate frame obtained through performing the generation processing of the intermediate frame based on the image of the last layer in the pyramid may be a final intermediate frame of the target video frame pair.

Further, in the process of implementing embodiments of the present disclosure, a feature coding module for an input picture may be used in the design of both the optical flow network and the synthesis network in the conventional video frame interpolation scheme. That is, the optical flow estimation model may construct a cost volume based on pixel-level features when performing optical flow estimation, and the pixel synthesis model may use a pixel-level feature map to provide context information. Therefore, a feature coding network for generating a feature map for an image may be shared by the bidirectional optical flow estimation model and the pixel synthesis model, in contrast to other schemes in which the optical flow network and the synthesis network operate separately. In some schemes in which the two networks operate separately, they may also use respective feature coding modules independently, which may result in redundant configuration of the modules, thereby resulting in a large parameter scale of the scheme, and increasing the implementation complexity of the scheme. In view of the above problems, in order to further reduce the parameter scale and the implementation complexity, in embodiments, the bidirectional optical flow estimation model and the pixel synthesis model may share the feature coding network to reduce model redundancy. Meanwhile, the robustness of generating a feature map for an image of each layer can also be improved. Specifically, the following method may be used.

When the generation processing of the intermediate frame is performed based on the image of each layer in the image pyramid, before the bidirectional optical flow obtained through the processing for the previous layer is repaired by using the optical flow estimation model, a first number of pixel-level feature maps with different resolutions may be generated for the image of the current layer in each image pyramid by using the preset feature coding network, to provide the pixel-level feature maps to the optical flow estimation model and the pixel synthesis model for repairing respectively.

In embodiments, the first number may be greater than or equal to 3, the feature coding network may be a convolutional network having at least a second number of down samplings, and the second number may be equal to the first number minus one. In embodiments, the first number and the second number may be set according to implementation needs. For example, when the first number is 3, the second number may be 2. That is, when the feature coding network has two down samplings, pixel-level feature maps having three different resolutions may be output.

In embodiments, the feature coding network may be specifically implemented by a 12-layer convolutional network. The feature coding network may be or include a convolutional network having at least two down samplings, and output feature maps having three different resolutions. The feature coding network may perform down samplings at layer 5 and layer 9 respectively, and finally output feature maps having three different resolutions (e.g., a feature map before each down sampling, and a feature map output by the convolution of the last layer). For example, the feature coding network may output feature maps from layer 4, layer 8 and layer 12 of the convolutional network. The above is merely an example of the specific implementation of the feature coding network, and embodiments are not limited thereto.

In one embodiment, in operation 102, when performing the generation processing of the intermediate frame based on the image of each layer in the image pyramid, the bidirectional optical flow obtained through the generation processing of the intermediate frame for the previous layer may be repaired as discussed below.

When the generation processing of the intermediate frame is performed based on the image of each layer in the image pyramid, a pixel-level feature map corresponding to the image of the current layer and the bidirectional optical flow obtained through the processing for the previous layer are input into the bidirectional optical flow estimation model for optical flow repairing. The pixel-level feature map may be or include a feature map output by the convolution of the last layer of the preset feature coding network when the image of the current layer is input to the feature coding network for processing, and the bidirectional optical flow may be or include an optical flow from each video frame in the target video frame pair to the intermediate frame to be generated currently.

Figure 2:
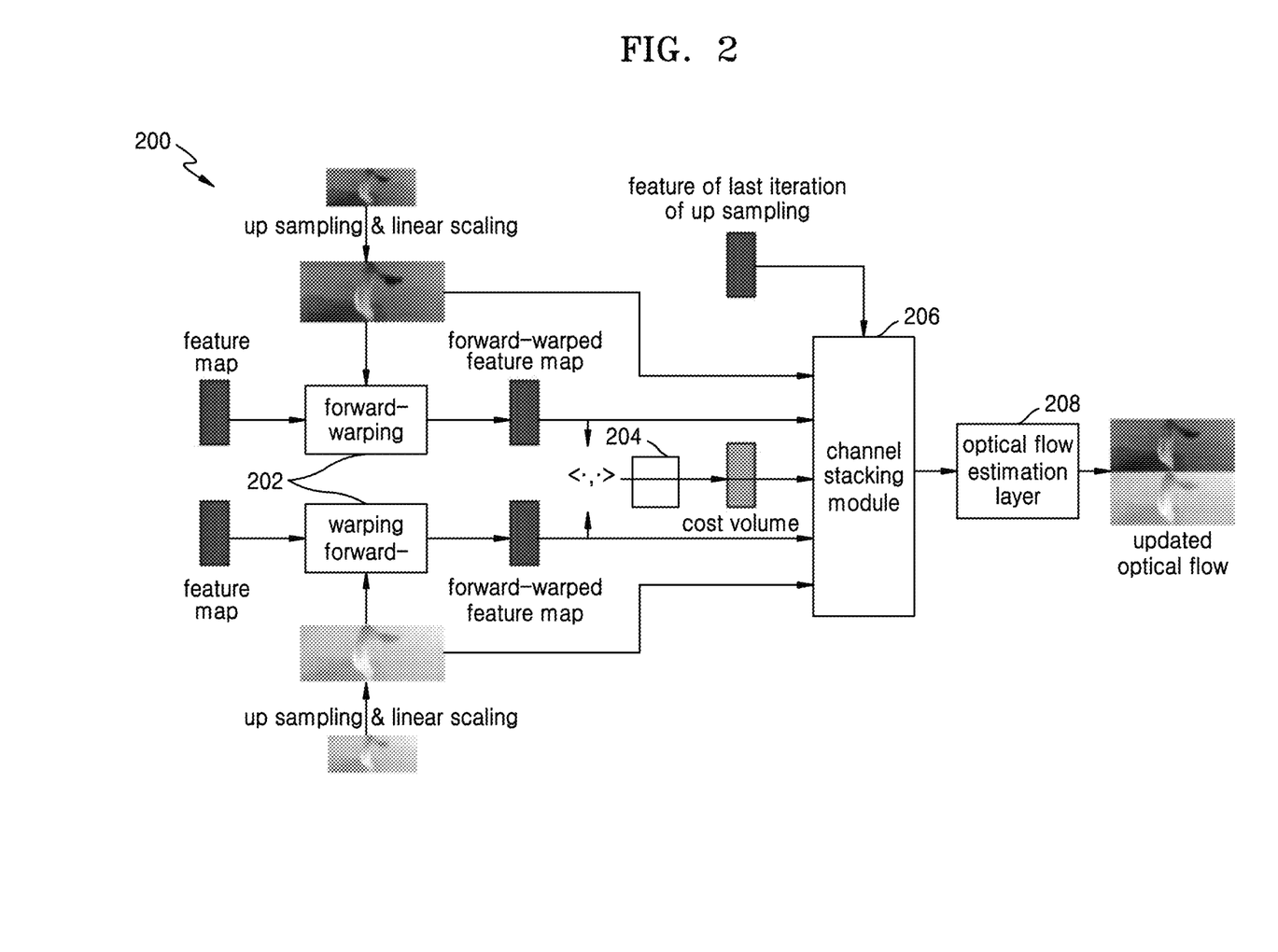
FIG. 2 is a schematic diagram of a bidirectional optical flow estimation model according to an embodiment.

In one embodiment, as shown in FIG. 2, a bidirectional optical flow estimation model 200 may perform optical flow repairing.

In embodiments, the bidirectional optical flow obtained through the processing for the previous layer may be linearly weighted to obtain an initial estimation value of a bidirectional optical flow obtained through processing for the current layer. In embodiments, the linear weighting may be performed using, for example, upsampling and linear scaling.

Here, a parameter related to the time used in the linear weighting may be the time corresponding to the intermediate frame to be generated currently, and the linear weighting may be performed by any technique known to one of ordinary skill in the art.

In particular, when performing the generation processing for an intermediate frame for the first layer, the linearly weighted object, e.g., an initial value of the bidirectional optical flow, may be set to 0.

Based on the initial estimation value of the bidirectional optical flow, forward-warping to the middle may be performed for encoded features of a pixel-level feature map corresponding to each image of the current layer by using a forward-warping layer 202 of the bidirectional optical flow estimation model 200.

It may be noted here that, considering that the conventional method for forward-warping to the middle has better support for multi-frame interpolation (generating multiple frames between two input pictures) and the overall algorithm framework is more concise, the technique for forward-warping to the middle may be selected for warping processing in embodiments, to align pixels in two feature maps corresponding to two video frames in the target video frame pair.

For example, the pixel-level feature map corresponding to each image of the current layer may be a feature map output by a convolution kernel of the last layer in the feature coding network.

Based on a forward-warped feature map obtained from the forward-warping layer 202, a partial cost volume may be constructed by using a cost volume layer 204 of the bidirectional optical flow estimation model 200.

In embodiments, the partial cost volume may be constructed by using the cost volume layer 204. It may be noted here that the cost volume may be used to represent a matching score of pixel-level features of two input images, and the partial cost volume may be a very discriminative representation for an optical flow task, specifically referring to a matching score of features of partial pixel blocks of corresponding pixels of one picture and the other picture.

Here, the partial cost volume may be constructed according to any technique known by one of ordinary skill in the art.

Channel stacking may be performed by a channel stacking module 206 based on the initial estimation value of the bidirectional optical flow, the forward-warped feature map, the partial cost volume, and a convolutional neural network (CNN) feature of the bidirectional optical flow obtained through the processing for the previous layer, and a result of the channel stacking may be input into an optical flow estimation layer 208 of the bidirectional optical flow estimation model 200, and optical flow estimation may be performed to obtain an updated optical flow, which may be or include a bidirectional optical flow repairing result of the current layer.

In embodiments, the optical flow estimation may be performed according to any technique known to those skilled in the art. In embodiments, the optical flow estimation layer 208 may be implemented using a 6-layer convolutional network, but embodiments are not limited thereto.

Figure 3:
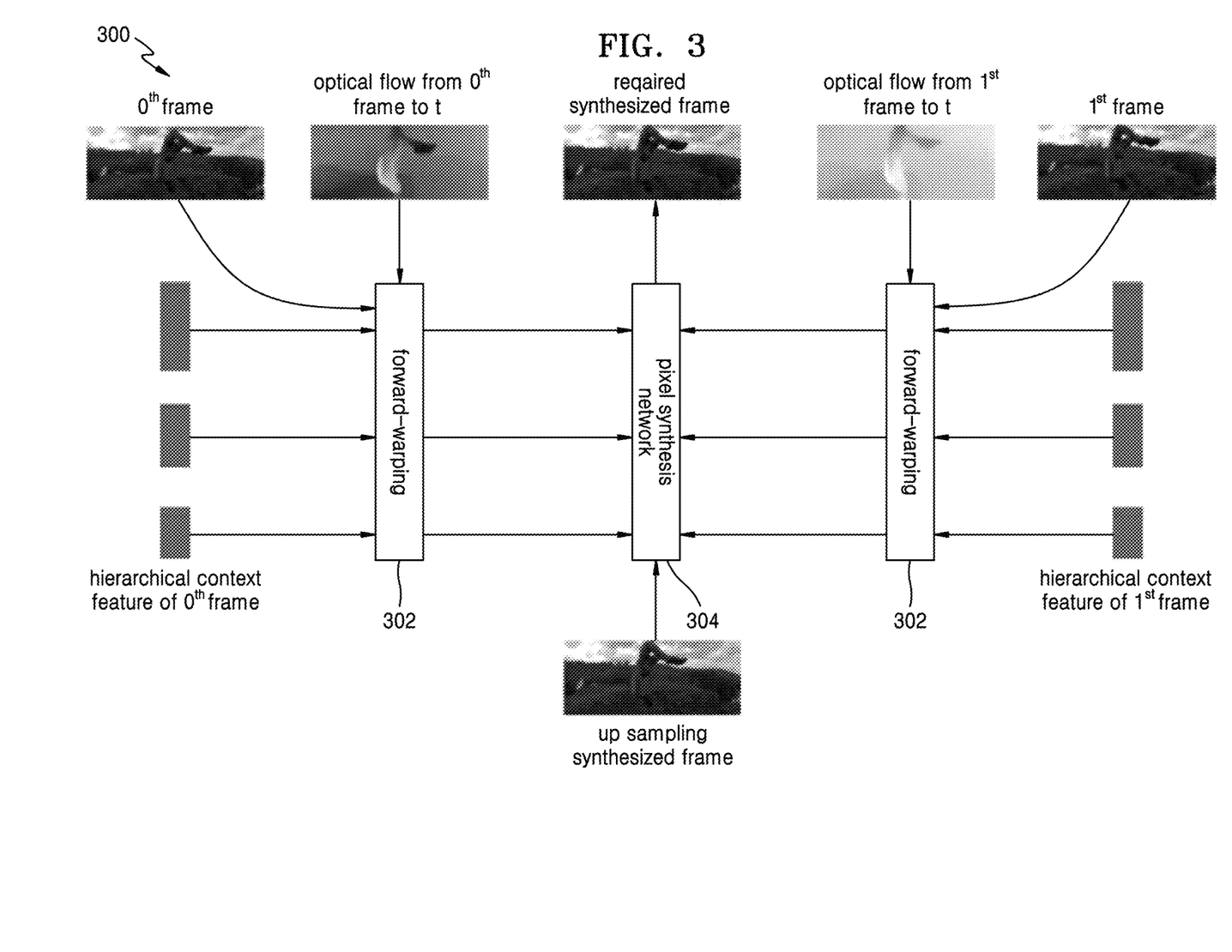
FIG. 3 is a schematic diagram of a pixel synthesis model according to an embodiment.

In embodiments, as shown in FIG. 3, in operation 102, when the generation processing of the intermediate frame is performed based on the image of each layer in the image pyramid, the intermediate frame obtained through the processing for the previous layer may be repaired by using the pixel synthesis model 300 as described below.

In embodiments, the target video frame pair may include a $0^{th}$ frame and a $1^{st}$ frame, and the intermediate frame may be a frame at a time t between the $0^{th}$ frame and the first frame. In embodiments, the repaired bidirectional optical flow may include a repaired optical flow from the $0^{th}$ frame to the time t, and a repaired optical flow from the $1^{st}$ frame to the time t. In embodiments, the repaired bidirectional optical flow may be linearly weighted.

In embodiments, for each video frame, forward-warping to the middle is performed for the image of the current layer in the video frame and a context feature of the image by using a forward-warping layer 302 of the pixel synthesis model 300. In embodiments, the forward-warping may be performed based on the linearly weighted optical flow corresponding to the video frame.

The context feature may include a feature map output by the feature coding network before each down sampling and a feature map output by the convolution of the last layer after the image of the current layer in the video frame is input to the feature coding network for processing.

In embodiments, the result of the forward-warping and the intermediate frame obtained through the processing for the previous layer may be input to a pixel synthesis network of the pixel synthesis model 304 for processing to obtain an intermediate frame repairing result in the current layer. In embodiments, the intermediate frame repairing result may be or include a repaired synthesized frame.

In embodiments, the pixel synthesis network 304 may be implemented by using a simple U-Net structure (including for example two parts: an encoding layer 306 and a decoding layer 308) with only two down sampling layers. Specifically, the input of the first layer coding layer of U-Net may include the intermediate frame obtained through the processing for the previous layer, an input picture after warping processing, and a context feature after warping processing (i.e., the feature map output by the feature coding network). In the input of the next layer after each down sampling of the coding layer, the context feature of the corresponding resolution after warping processing may include embedded. The U-Net may include two down sampling layers and two corresponding up sampling layers. Using a decoding network including the two up sampling layers, the repaired intermediate frame in the layer of the pyramid may be obtained.

In practical applications, in particular, for the first layer processing, the initial value of the intermediate frame may be the average result of two warped images of the current layer.

Further, in the embodiments discussed above, the optical flow obtained through the processing for the previous layer may be repaired when performing processing for each layer, so that a final optical flow estimation result may be obtained with high accuracy. In practical applications, the optical flow related to the intermediate frame may be applied not only to video frame interpolation, but also to moving object detection, video salient area detection, etc. In particular, because the embodiments described above may use a flexible pyramid recursive structure, embodiments may flexibly process a small optical flow, a large optical flow and a complex non-linear optical flow. In this way, a more accurate optical flow estimation value may be obtained according to the embodiments described above. For example, after the intermediate frame is obtained based on an image of the lowest layer in the image pyramid, the bidirectional optical flow obtained through performing the repairing based on the image of the current layer may be output.

Figure 4:
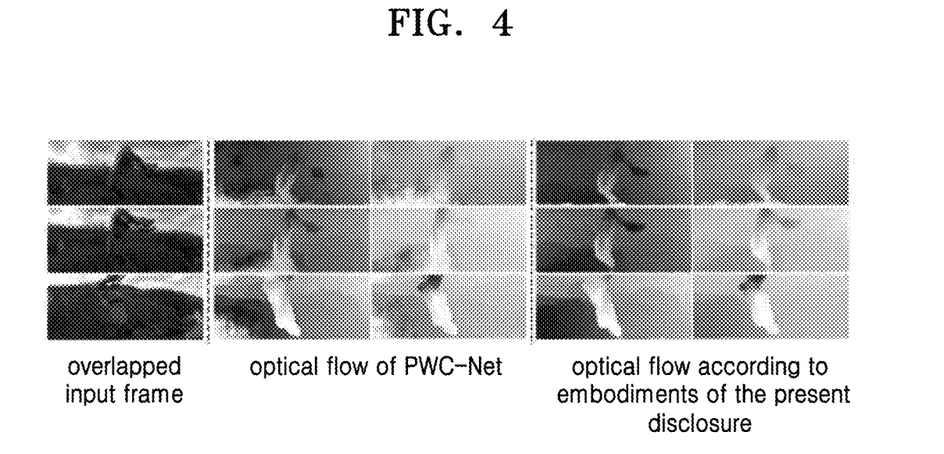
FIG. 4 is a schematic diagram illustrating the effect comparison of optical flow estimation between an embodiment and a conventional PWC-Net algorithm.

As shown in FIG. 4, the method embodiments can obtain a more accurate and efficient effect and have obvious application advantages compared with a PWC-Net algorithm when estimating a complex large optical flow.

Figure 5:
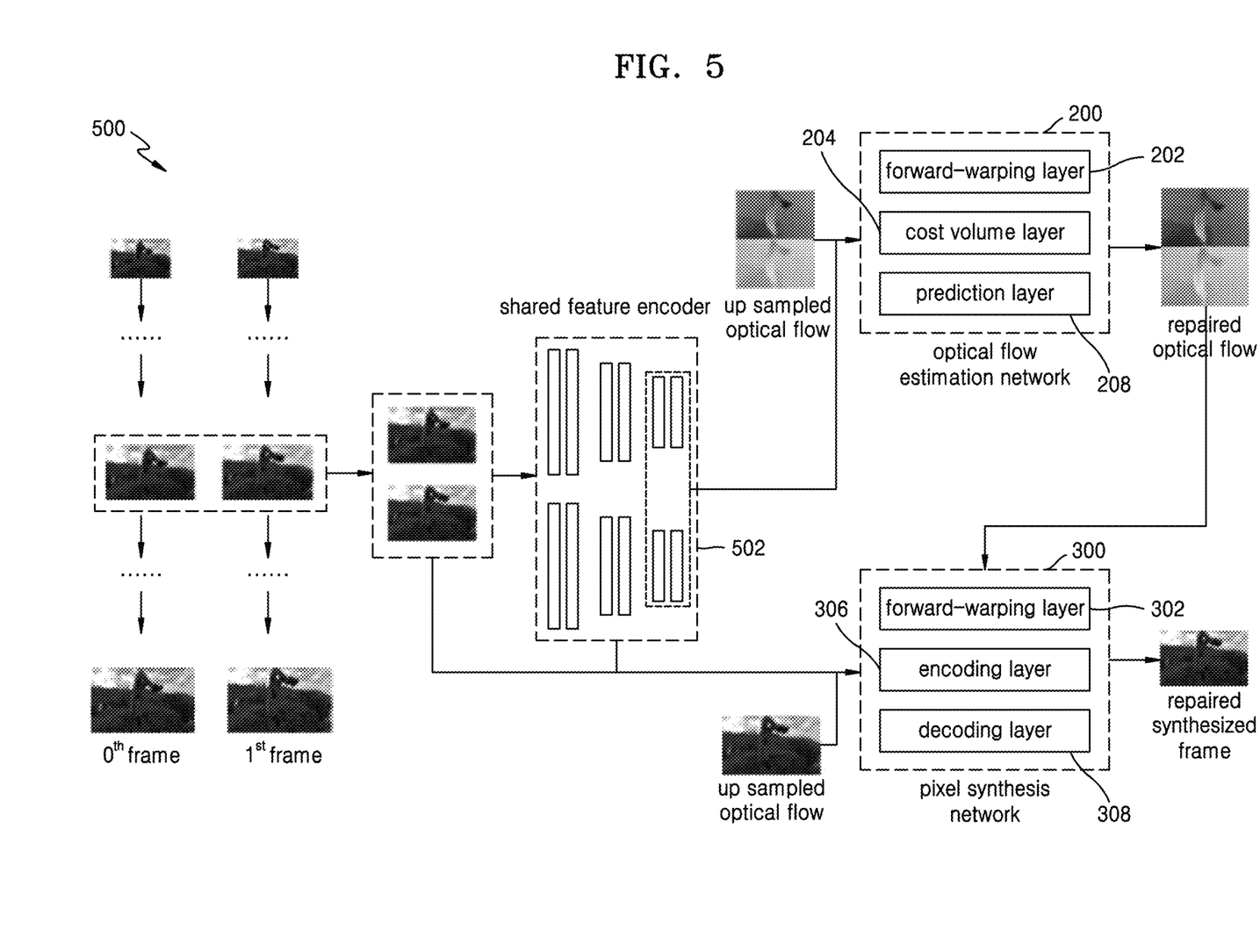
FIG. 5 is a schematic diagram illustrating the structure of a video intermediate frame generation model according to an embodiment.

FIG. 5 is a schematic diagram illustrating the structure of a video intermediate frame generation model 500 corresponding to embodiments described above. As shown in FIG. 5, the video intermediate frame generation model 500 may be a pyramid recursive network. This structure may enable the video intermediate frame generation model 500 to flexibly process input pictures with different resolutions by using the specified layer of the pyramid at the testing stage. The same recursive unit may be repeatedly executed at different layers of the image pyramid, and a final estimated intermediate frame may be output at the layer with the highest resolution. In order to construct the recursive unit, a feature coding network, for example a shared feature encoder 502 may be used first to extract pixel-level features of the input pictures, and then the bidirectional optical flow estimation model 200 and the pixel synthesis model 300 may be used respectively to modify the optical flow and the intermediate frame estimated at the previous layer. In particular, forward warping may be used to compensate the optical flow between frames. Because the bidirectional optical flow between the input pictures may be estimated in embodiments, an optical flow from an input frame to the intermediate frame used for forward warping may be easily obtained by linear weighting, so the method according to embodiments may easily estimate a frame at any time between two input video frames.

It can be seen from the above description that in a video intermediate frame generation scheme according to embodiments, when the generation processing of the intermediate frame is performed based on the image of each layer, the optical flow and the intermediate frame may be repaired, which may effectively improve the robustness of the quality of optical flow estimation, so that the trueness, veracity, or accuracy of the intermediate frame can be effectively improved, and the effect of frame interpolation can be effectively improved. Furthermore, by repairing the intermediate frame in the processing for each layer, the scale of the pixel synthesis model may be greatly reduced, and the number of parameters of the model may be reduced. In addition, the network parameter scale of the entire implementation scheme may be effectively reduced by using a layer-by-layer recursive calling model to generate the intermediate frame, thereby effectively reducing the implementation complexity and improving the generation efficiency of the intermediate frame. Further, by making the optical flow estimation model and the pixel synthesis model share the feature coding network, the model architecture of the above method embodiments may be very lightweight, and the number of parameters may be less than 1/10 of that of other schemes.

Based on the above technical advantages, embodiments may have a strong application potential under the limitation of application requirements with high real-time requirements or low computing power consumption. Specifically, based on the advantage that embodiments may be very lightweight, embodiments may be applied to a video frame interpolation scheme on a terminal. In addition, embodiments may also be applied to downstream tasks based on the video frame interpolation, such as video compression and view angle synthesis. Embodiments may also be applied to relieve the transmission pressure of video data in metaverse projects, for example to transmit a low frame rate video and recover a high frame rate video through a frame interpolation technology. In addition, by using the advantage of improving the accuracy of the bidirectional optical flow estimation value, embodiments may also be applied to various applications related to optical flows.

In combination with specific implementation embodiments of single-frame video frame interpolation and multi-frame video frame interpolation, examples of the technical effects of embodiments are further described below.

1. Single-Frame Video Frame Interpolation

Figure 6:
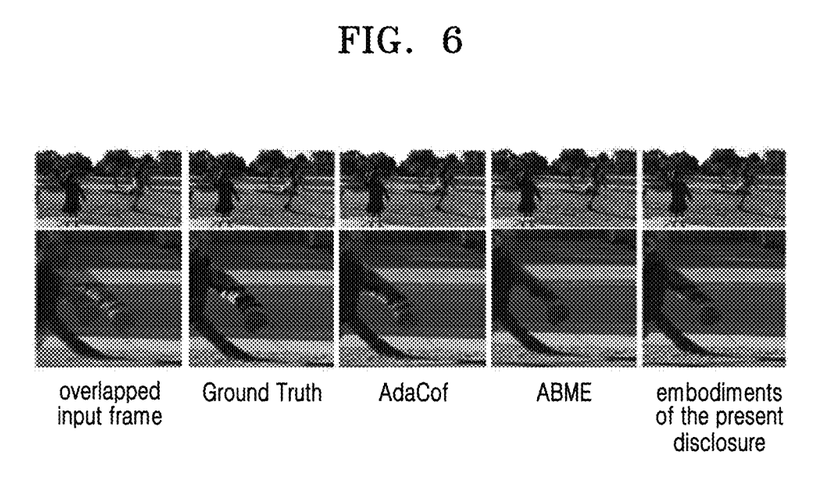
FIG. 6 is a schematic diagram illustrating an example and comparison of single-frame video frame interpolation in an embodiment and a conventional scheme.

A common requirement for video frame interpolation may be to synthesize an intermediate frame between two consecutive video frames (for example a 0th frame and a 1st frame), for example to synthesize a 0.5th frame. As shown in FIG. 6, from the left side, the first column may be an input frame with the two video frames overlapped, the second column may be a target intermediate frame (i.e., a true intermediate frame, ground truth), the third and fourth columns are intermediate frames obtained by using two video frame interpolation algorithms, Adaptive Collaboration of Flows (AdaCoF) and Asymmetric Bilateral Motion Estimation (ABME) respectively, and the fifth column is an intermediate frame obtained by using the embodiments of the present disclosure. The second row may show an enlargement of the local picture in the first row. Based on this row of images, it is easier to see a slight difference between the intermediate frames synthesized by different algorithms. It can be seen from FIG. 6 that in the case of a local complex non-linear optical flow (in the second row), the method embodiments can achieve good results, for example in comparison with the AdaCoF and ABME algorithms.

2. Multi-Frame Video Frame Interpolation

Figure 7:
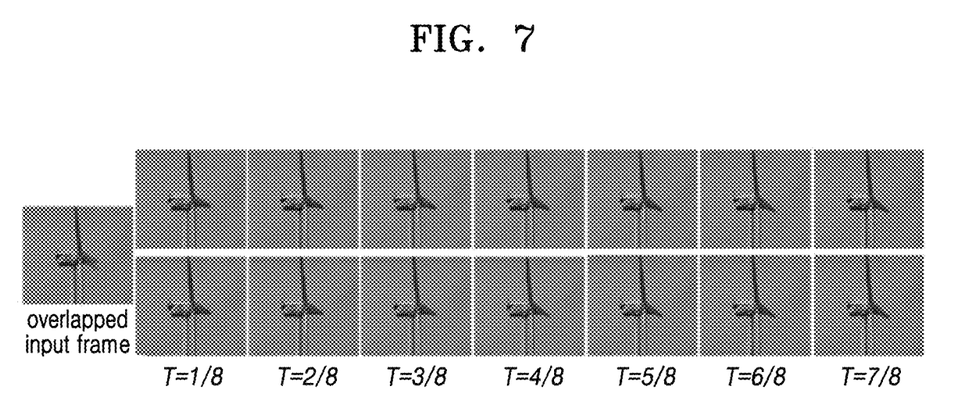
FIG. 7 is a schematic diagram illustrating an example of multi-frame video frame interpolation according to an embodiment.

If an original video has a relatively low frame rate (e.g., 25 FPS), it may be desirable to interpolate multiple frames between two consecutive frames, in order to achieve a higher frame rate (e.g., 120 FPS). Based on a linear weighting method, an optical flow from an input frame to an intermediate frame at any time may be approximately obtained, and then the intermediate frame at any time may be synthesized in combination with a forward warping method. When multiple intermediate frames are generated, operation 102 described above may be performed for a corresponding number of times to obtain a corresponding number of intermediate frames. FIG. 7 shows a diagram of an example of multi frame video frame interpolation, in which the first row shows target intermediate frames, and the second row shows intermediate frames at different times obtained by using the embodiments of the present disclosure. It can be seen from FIG. 7 that multiple intermediate frames obtained by using embodiments may be very close to the target intermediate frames.

Figure 8:
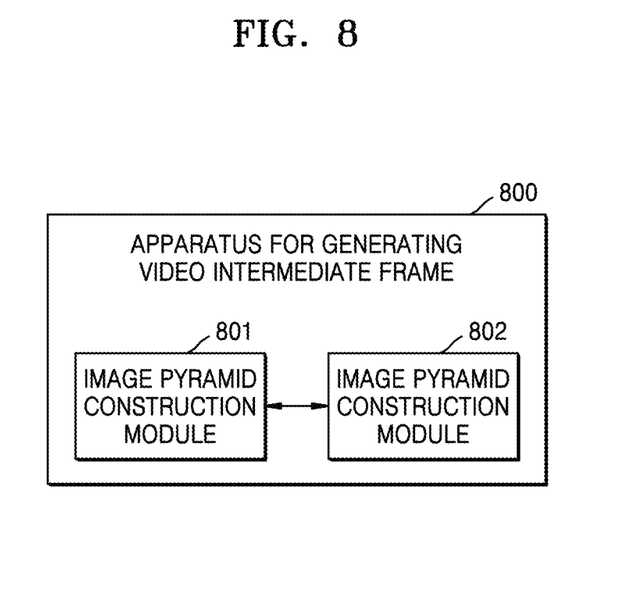
FIG. 8 is a schematic diagram illustrating the structure of an apparatus according to an embodiment.

FIG. 8 shows an example of an apparatus for generating a video intermediate frame. As shown in FIG. 8, the apparatus may include an image pyramid construction module 801, which may be configured to obtain a target video frame pair, and construct an image pyramid for each video frame in the target video frame pair; and an intermediate frame generation module 802, which may be configured to, based on the image pyramid, with a layer-by-layer recursive calling manner according to an order of the image pyramid from high layer to low layer, generate an intermediate frame of the target video frame pair by using a pre-trained bidirectional optical flow estimation model and a pixel synthesis model. When the generation processing of the intermediate frame is performed based on an image of each layer in the image pyramid, based on an image of a current layer, a bidirectional optical flow obtained through the processing for a previous layer may be repaired by using the optical flow estimation model, and based on the repaired bidirectional optical flow and the image of the current layer, an intermediate frame obtained through the processing for the previous layer may be repaired by using the pixel synthesis model, to obtain an intermediate frame output by the processing for the current layer.

It may be noted that the above method and apparatus may correspond with each other. Because the method and the apparatus adopt similar principles, the implementations of the apparatus and the method may be performed with reference to each other, and redundant description may not be provided.

Based on embodiments described above, embodiments of the present disclosure may also include a device for generating a video intermediate frame, including a processor and a memory. The memory stores an application program that can be executed by the processor to cause the processor to perform the method for generating a video intermediate frame as described above. Specifically, a system or apparatus configured with a storage medium may be provided. The storage medium stores software program codes that can implement the functions of any one of the above embodiments, and can be read and executed by a computer (or a central processing unit (CPU) or a microprocessor unit (MPU)) of the system or apparatus. Furthermore, part or all of actual operations may be completed by an operating system or the like that operates on the computer through instructions based on the program codes. The program codes read from the storage medium may also be written to a memory set in an expansion board inserted in the computer or into a memory set in an expansion unit connected to the computer. Then, the instructions based on the program codes cause a CPU or the like installed on the expansion board or the expansion unit to perform part or all of the actual operations, so as to realize the functions of any one of the embodiments of the above method for generating a video intermediate frame.

The memory may be specifically implemented as various storage medias such as an electrically erasable programmable read-only memory (EEPROM), a flash memory, and a programmable program read-only memory (PROM). The processor may be implemented to include one or more central processors or one or more field programmable gate arrays. The field programmable gate arrays are integrated with one or more central processor cores. Specifically, the central processors or the central processor cores may be implemented as CPUs or MCUs.

Embodiments of the present disclosure implement a computer program product including computer programs/instructions which, when executed by a processor, perform the operations of the process for generating a video intermediate frame as described above.

It may be noted that not all the operations and modules in the above flowcharts and structure diagrams are necessary, and some steps or modules may be omitted according to actual requirements. The execution order of the various operations is not fixed and may be adjusted as required. The division of the various modules is only for the convenience of describing the functional division adopted. In actual implementations, one module may be implemented as multiple modules, and the functions of multiple modules may also be implemented by the same module. These modules may be located in the same device or in different devices.

Hardware modules in the various embodiments may be implemented mechanically or electronically. For example, a hardware module may include a specially designed permanent circuit or logic device (e.g., a dedicated processor such as an FPGA or an ASIC) to perform a particular operation. The hardware module may also include a programmable logic device or circuit (e.g., including a general purpose processor or other programmable processors) temporarily configured by software to perform a specific operation. As for the specific implementation of the hardware modules by a mechanical mean, or by a dedicated permanent circuit, or by a temporarily configured circuit (e.g., configured by software), it can be determined based on the consideration of cost and time.

As used herein, "schematic" means "serving as an instance, example, or illustration". Any diagram and embodiment described as "schematic" herein should not be interpreted as a more preferred or advantageous technical solution. For simplicity of the drawings, the figures only schematically show those portions related to the present invention and do not present the actual structure of a product. In addition, for simplicity of the drawings and ease of understanding, only one of components with the same structure or function is schematically drawn or marked in some figures. As used herein, "one" does not mean that the number of portions related to the present invention is limited to "only one", and "one" does not mean that a case that the number of portions related to the present invention is "more than one" is excluded. As used herein, "up", "down", "front", "back", "left", "right", "inner", "outer", and the like are only used to indicate relative positional relationship between related portions, and rather than limit the absolute positions of these related portions.

The foregoing relate to embodiments and is not intended to limit the scope of the present disclosure. Any modification, equivalent substitution and improvement are within the scope of the present disclosure.

In accordance with an aspect of the disclosure, a method for generating a video intermediate frame includes: obtaining a target video frame pair; constructing an image pyramid for each video frame in the target video frame pair; and based on the image pyramid, generating an intermediate frame of the target video frame pair by using a pre-trained bidirectional optical flow estimation model and a pixel synthesis model in a layer-by-layer recursive calling manner according to an order of the image pyramid from a high layer to a low layer, wherein based on the intermediate frame being generated based on an image of each layer in the image pyramid, a bidirectional optical flow corresponding to a previous layer is repaired using the bidirectional optical flow estimation model based on an image of a current layer, and wherein based on the repaired bidirectional optical flow and the image of the current layer, a previous intermediate frame corresponding to the previous layer is repaired using the pixel synthesis model, to obtain a current intermediate frame corresponding to the current layer.

The method may further include: before the bidirectional optical flow corresponding to the previous layer is repaired using the bidirectional optical flow estimation model, generating a first number of pixel-level feature maps having different resolutions for the image of the current layer in each image pyramid using a shared feature coding network, in order to provide the pixel-level feature maps to the bidirectional optical flow estimation model and the pixel synthesis model, the first number may be greater than or equal to 3, the shared feature coding network may include a convolutional network having at least a second number of down samplings, and the second number may be equal to the first number minus one.

Obtaining the bidirectional optical flow corresponding to the previous layer may include: inputting a pixel-level feature map corresponding to the image of the current layer and the bidirectional optical flow corresponding to the previous layer into the bidirectional optical flow estimation model, the pixel-level feature map may include a feature map output by convolution of a last layer of the shared feature coding network as a result of the image of the current layer being input to the shared feature coding network, and the bidirectional optical flow may include an optical flow from each video frame to the intermediate frame.

The repairing of the optical flow may include: linearly weighting the bidirectional optical flow corresponding to the previous layer to obtain an initial estimation value of a bidirectional optical flow corresponding to the current layer; based on the initial estimation value, performing forward-warping on the pixel-level feature map corresponding to each image of the current layer using a forward-warping layer of the bidirectional optical flow estimation model; based on a forward-warped feature map obtained by the forward-warping, constructing a partial cost volume using a cost volume layer of the bidirectional optical flow estimation model; performing channel stacking based on the initial estimation value, the forward-warped feature map, the partial cost volume, and a convolutional neural network (CNN) feature of the bidirectional optical flow corresponding to the previous layer; inputting a result of the channel stacking into an optical flow estimation layer of the bidirectional optical flow estimation model; and performing optical flow estimation to obtain a bidirectional optical flow repairing result corresponding to the current layer.

Obtaining the previous intermediate frame may include linearly weighting the repaired bidirectional optical flow; for each video frame, performing forward-warping for the image of the current layer in the video frame and a context feature of the image using a forward-warping layer of the pixel synthesis model based on the linearly weighted optical flow corresponding to the video frame, the context feature may include a feature map output by a shared feature coding network before each down sampling and a feature map output by convolution of a last layer after the image of the current layer in the video frame is input to the shared feature coding network for processing; and inputting a result of the forward-warping and the previous intermediate frame to a pixel synthesis network of the pixel synthesis model to obtain an intermediate frame repairing result corresponding to the current layer.

The method may further include: after the intermediate frame is obtained based on an image of the lowest layer in the image pyramid, outputting the bidirectional optical flow.

In accordance with an aspect of the disclosure, an apparatus for generating a video intermediate frame includes an image pyramid construction module configured to obtain a target video frame pair, and to construct an image pyramid for each video frame in the target video frame pair; and an intermediate frame generation module configured to: based on the image pyramid, generate an intermediate frame of the target video frame pair by using a pre-trained bidirectional optical flow estimation model and a pixel synthesis model in a layer-by-layer recursive calling manner according to an order of the image pyramid from a high layer to a low layer, wherein based on the intermediate frame being generated based on an image of each layer in the image pyramid, a bidirectional optical flow corresponding to a previous layer is repaired by using the bidirectional optical flow estimation model based on an image of a current layer, and wherein based on the repaired bidirectional optical flow and the image of the current layer, a previous intermediate frame corresponding to the previous layer is repaired by using the pixel synthesis model, to obtain a current intermediate frame corresponding to the current layer.

In accordance with an aspect of the disclosure, a device for generating a video intermediate frame includes at least one processor; and a memory configured to store instructions which, when executed by the at least one processor, cause the at least one processor to: obtain a target video frame pair; construct an image pyramid for each video frame in the target video frame pair; and based on the image pyramid, generate an intermediate frame of the target video frame pair by using a pre-trained bidirectional optical flow estimation model and a pixel synthesis model in a layer-by-layer recursive calling manner according to an order of the image pyramid from a high layer to a low layer, wherein based on the intermediate frame being generated based on an image of each layer in the image pyramid, a bidirectional optical flow corresponding to a previous layer is repaired using the bidirectional optical flow estimation model based on an image of a current layer, and wherein based on the repaired bidirectional optical flow and the image of the current layer, a previous intermediate frame corresponding to the previous layer is repaired using the pixel synthesis model, to obtain a current intermediate frame corresponding to the current layer.

In accordance with an aspect of the disclosure, a non-transitory computer-readable storage medium stores computer-readable instructions, which, when executed by at least one processor, cause the at least one processor to: obtain a target video frame pair; construct an image pyramid for each video frame in the target video frame pair; and based on the image pyramid, generate an intermediate frame of the target video frame pair by using a pre-trained bidirectional optical flow estimation model and a pixel synthesis model in a layer-by-layer recursive calling manner according to an order of the image pyramid from a high layer to a low layer, wherein based on the intermediate frame being generated based on an image of each layer in the image pyramid, a bidirectional optical flow corresponding to a previous layer is repaired using the bidirectional optical flow estimation model based on an image of a current layer, and wherein based on the repaired bidirectional optical flow and the image of the current layer, a previous intermediate frame corresponding to the previous layer is repaired using the pixel synthesis model, to obtain a current intermediate frame corresponding to the current layer.

The invention claimed is:

1. A method for generating a video intermediate frame, comprising:
   obtaining a target video frame pair;
   constructing an image pyramid for each video frame in the target video frame pair; and
   generating an intermediate frame of the target video frame pair by using a bidirectional optical flow estimation model and a pixel synthesis model in a layer-by-layer recursive calling manner according to an order of the image pyramid from a high layer to a low layer based on the image pyramid,
   wherein the generating of the intermediate frame of the target video frame pair comprises:

repairing a bidirectional optical flow corresponding to a previous layer using the bidirectional optical flow estimation model, and repairing a previous intermediate frame corresponding to the previous layer using the pixel synthesis model.

2. The method of claim 1, wherein the generating of the intermediate frame of the target video frame pair further comprising:

generating a first number of pixel-level feature maps having different resolutions for an image of a current layer in each image pyramid using a feature coding network, in order to provide the pixel-level feature maps to the bidirectional optical flow estimation model and the pixel synthesis model.

3. The method of claim 2, wherein the first number is greater than or equal to 3, wherein the feature coding network comprises a convolutional network having at least a second number of down samplings, and wherein the second number is equal to the first number minus one.

4. The method of claim 1, wherein the repairing of bidirectional optical flow corresponding to the previous layer comprising:

inputting a pixel-level feature map corresponding to an image of a current layer and the bidirectional optical flow corresponding to the previous layer into the bidirectional optical flow estimation model, wherein the pixel-level feature map comprises a feature map output by convolution of a last layer of a feature coding network as a result of the image of the current layer being input to the feature coding network, and wherein the bidirectional optical flow comprises an optical flow from each video frame to the intermediate frame.

5. The method of claim 4, wherein the repairing of the bidirectional optical flow comprising:

linearly weighting the bidirectional optical flow corresponding to the previous layer to obtain an initial estimation value of a bidirectional optical flow corresponding to the current layer;

based on the initial estimation value, performing forward-warping on the pixel-level feature map corresponding to each image of the current layer using a forward-warping layer of the bidirectional optical flow estimation model;

based on a forward-warped feature map obtained by the forward-warping, constructing a partial cost volume using a cost volume layer of the bidirectional optical flow estimation model;

performing channel stacking based on the initial estimation value, the forward-warped feature map, the partial cost volume, and a convolutional neural network (CNN) feature of the bidirectional optical flow corresponding to the previous layer;

inputting a result of the channel stacking into an optical flow estimation layer of the bidirectional optical flow estimation model; and performing optical flow estimation to obtain a bidirectional optical flow repairing result corresponding to the current layer.

6. The method of claim 1, wherein repairing the previous intermediate frame comprises:

linearly weighting the repaired bidirectional optical flow;

for each video frame, performing forward-warping for an image of a current layer in the video frame and a context feature of the image using a forward-warping layer of the pixel synthesis model based on the linearly weighted optical flow corresponding to the video frame, wherein the context feature includes a feature map output by a feature coding network before each down sampling and a feature map output by convolution of a last layer after the image of the current layer in the video frame is input to the feature coding network for processing; and inputting a result of the forward-warping and the previous intermediate frame to a pixel synthesis network of the pixel synthesis model to obtain an intermediate frame repairing result corresponding to the current layer.

7. The method of claim 1, further comprising:

after the intermediate frame is obtained based on an image of the lowest layer in the image pyramid, outputting the bidirectional optical flow.

8. The method of claim 2, wherein the feature coding network is shared by the bidirectional optical flow estimation model and the pixel synthesis model.

9. The method of claim 1, wherein the generated video intermediate frame is used for single-frame video frame interpolation or multi-frame video frame interpolation.

10. An apparatus for generating a video intermediate frame, comprising:

at least one processor; and a memory configured to store instructions which, when executed by the at least one processor, cause the at least one processor to:

obtain a target video frame pair;

construct an image pyramid for each video frame in the target video frame pair; and generate an intermediate frame of the target video frame pair by using a bidirectional optical flow estimation model and a pixel synthesis model in a layer-by-layer recursive calling manner according to an order of the image pyramid from a high layer to a low layer based on pyramid, wherein the at least one processor configured, when generating the intermediate frame of the target video frame pair, to:

repairing a bidirectional optical flow corresponding to a previous layer by using the bidirectional optical flow estimation model, and repairing a previous intermediate frame corresponding to the previous layer by using the pixel synthesis model.

11. The apparatus of claim 10, wherein the at least one processor further configured, when generating the intermediate frame of the target video frame pair, to:

generate a first number of pixel-level feature maps having different resolutions for an image of a current layer in each image pyramid using a feature coding network, in order to provide the pixel-level feature maps to the bidirectional optical flow estimation model and the pixel synthesis model.

12. The apparatus of claim 11, wherein the first number is greater than or equal to 3, wherein the feature coding network comprises a convolutional network having at least a second number of down samplings, and wherein the second number is equal to the first number minus one.

13. The apparatus of claim 10, wherein the at least one processor configured, when repairing bidirectional optical flow corresponding to the previous layer, to:

input a pixel-level feature map corresponding to an image of a current layer and the bidirectional optical flow corresponding to the previous layer into the bidirectional optical flow estimation model,
wherein the pixel-level feature map comprises a feature map output by convolution of a last layer of a feature coding network as a result of the image of the current layer being input to the feature coding network, and
wherein the bidirectional optical flow comprises an optical flow from each video frame to the intermediate frame.

14. The apparatus of claim 13, wherein the at least one processor further configured, when repairing the bidirectional optical flow, to:
linearly weigh the bidirectional optical flow corresponding to the previous layer to obtain an initial estimation value of a bidirectional optical flow corresponding to the current layer;
based on the initial estimation value, perform forward-warping on the pixel-level feature map corresponding to each image of the current layer using a forward-warping layer of the bidirectional optical flow estimation model;
based on a forward-warped feature map obtained by the forward-warping, construct a partial cost volume using a cost volume layer of the bidirectional optical flow estimation model;
perform channel stacking based on the initial estimation value, the forward-warped feature map, the partial cost volume, and a convolutional neural network (CNN) feature of the bidirectional optical flow corresponding to the previous layer;
input a result of the channel stacking into an optical flow estimation layer of the bidirectional optical flow estimation model; and
perform optical flow estimation to obtain a bidirectional optical flow repairing result corresponding to the current layer.

15. The apparatus of claim 10, wherein the at least one processor configured, when repairing the previous intermediate frame, to:
linearly weight the repaired bidirectional optical flow;
for each video frame, perform forward-warping for an image of a current layer in the video frame and a context feature of the image using a forward-warping layer of the pixel synthesis model based on the linearly weighted optical flow corresponding to the video frame, wherein the context feature includes a feature map output by a feature coding network before each down sampling and a feature map output by convolution of a last layer after the image of the current layer in the video frame is input to the feature coding network for processing; and input a result of the forward-warping and the previous intermediate frame to a pixel synthesis network of the pixel synthesis model to obtain an intermediate frame repairing result corresponding to the current layer.

16. The apparatus of claim 10, wherein the at least one processor further configured to:
after the intermediate frame is obtained based on an image of the lowest layer in the image pyramid, output the bidirectional optical flow.

17. The apparatus of claim 11, wherein the feature coding network is shared by the bidirectional optical flow estimation model and the pixel synthesis model.

18. The apparatus of claim 10, wherein the generated video intermediate frame is used for single-frame video frame interpolation or multi-frame video frame interpolation.

19. A non-transitory computer-readable storage medium storing computer-readable instructions, which, when executed by at least one processor, cause the at least one processor to:
obtain a target video frame pair;
construct an image pyramid for each video frame in the target video frame pair; and
generate an intermediate frame of the target video frame pair by using a bidirectional optical flow estimation model and a pixel synthesis model in a layer-by-layer recursive calling manner according to an order of the image pyramid from a high layer to a low layer based on the image pyramid,
wherein the at least one processor configured, when generating the intermediate frame of the target video frame pair, to:
repair a bidirectional optical flow corresponding to a previous layer using the bidirectional optical flow estimation model based on an image of a current layer;
repair a previous intermediate frame corresponding to the previous layer using the pixel synthesis model.

20. The non-transitory computer-readable storage medium of claim 19, wherein the at least one processor further configured, when generating the intermediate frame of the target video frame pair, to:
generate a first number of pixel-level feature maps having different resolutions for the image of the current layer in each image pyramid using a feature coding network, in order to provide the pixel-level feature maps to the bidirectional optical flow estimation model and the pixel synthesis model.

* * * * *